United States Patent [19]

Tzikas

[11] 4,329,456
[45] May 11, 1982

[54] PROCESS FOR THE PREPARATION OF VAT DYES

[75] Inventor: Athanassios Tzikas, Pratteln, Switzerland

[73] Assignee: Ciba-Geigy AG, Basel, Switzerland

[21] Appl. No.: 149,954

[22] Filed: May 15, 1980

[30] Foreign Application Priority Data

May 17, 1979 [CH] Switzerland .................. 4595/79

[51] Int. Cl.³ .................. C07D 413/10; C07D 251/52; C07D 251/70; C07D 403/10
[52] U.S. Cl. .................. 544/113; 544/188; 544/100; 544/187
[58] Field of Search .................. 544/187, 188, 100, 113

[56] References Cited

U.S. PATENT DOCUMENTS

| | | | |
|---|---|---|---|
| 3,639,430 | 2/1972 | Altermatt | 544/187 |
| 3,684,808 | 8/1972 | Ulrich | 544/187 |
| 3,870,717 | 3/1975 | Ulrich et al. | 544/187 |
| 3,920,632 | 11/1975 | Hohmann et al. | 544/187 |

FOREIGN PATENT DOCUMENTS 399485 7/1924 Fed. Rep. of Germany .
1178224 12/1958 France .

*Primary Examiner*—John M. Ford
*Attorney, Agent, or Firm*—Wenderoth, Lind & Ponack

[57] ABSTRACT

The present invention relates to a process for the preparation of vat dyes of the formula

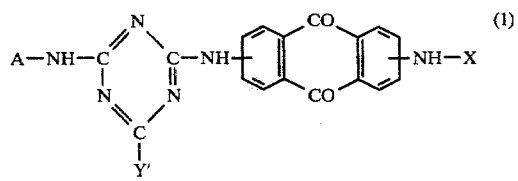

(1)

in which A is a vattable radical, X is an acyl radical and Y' is a halogen atom, an amino group or an aryloxy group, which comprises acylating compounds of the formula

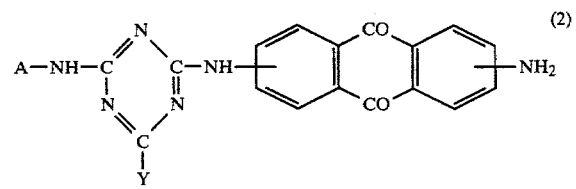

(2)

in which A is as defined under formula (1) and Y is a halogen atom, with an acylating agent which contains the acyl radical X, and, if desired, subjecting the compounds of the formula (2), before or after acylation, to a condensation reaction with an amine or an aromatic hydroxy compound.

7 Claims, No Drawings

PROCESS FOR THE PREPARATION OF VAT DYES

The present invention relates to a process for the preparation of vat dyes of the formula

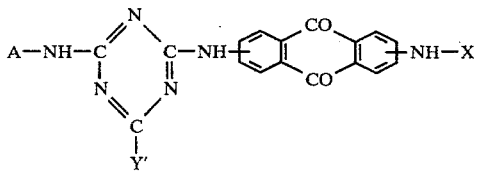

in which A is a vattable radical, X is an acyl radical and Y' is a halogen atom, an amino group or an aryloxy group, which comprises acylating compounds of the formula

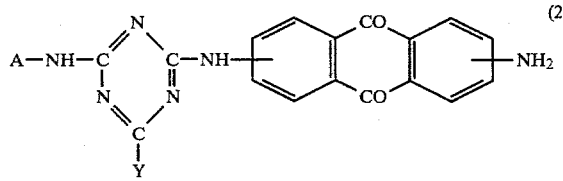

in which A is as defined under formula (1) and Y is a halogen atom, with an acylating agent which contains the acyl radical X, and, if desired, subjecting the compounds of the formula (2), before or after acylation, to a condensation reaction with an amine or an aromatic hydroxy compound.

In formula (1), in the anthraquinone nucleus, the X-NH group is bonded to the outer benzene ring and the —NH— bridge member to the triazine radical is bonded to the inner benzene ring. Independently of one another, the X-NH group and the —NH— bridge member can be in the α-position or β-position of the anthraquinone nucleus.

Radicals suitable as the vattable radical A are the radical of one of the known vattable polycyclic quinonoid ring systems, for example from the series of the anthrapyrimidines, anthrapyridones, anthrapyrimidones, azabenzanthrones, benzanthrones, anthranthrones, anthrimides, anthrimidocarbazoles, isothiazoloanthrones, pyrazoloanthrones, pyrimidoanthrones and anthraquinone compounds which are derived from 9,10-dioxoanthracene and can contain further fused carbocyclic and heterocyclic rings, such as quinazolinoanthraquinones, oxazoloanthraquinones, thiazoloanthraquinones, oxadiazoloanthraquinones, pyrazoloanthraquinones and pyrazinonoanthraquinones, and preferably radicals of anthraquinones bonded in the 1- or 2-position and radicals of 3,4-phthaloylacridones bonded in the 2- or 8-position, and all of these radicals can carry the substituents customary in vat dyes. Examples of such substituents are: halogen atoms, especially chlorine, fluorine or bromine, amino and alkyl, alkoxy, aryl, aryloxy, aralkyl, aralkyloxy, arylamino, alkylthio, arylthio, nitro, cyano and thiocyano groups. In this specification alkyl is to be understood as meaning, in particular, radicals having 1 to 4 carbon atoms, aryl is to be understood as meaning, in particular, radicals such as phenyl, tolyl, chlorophenyl, methoxyphenyl or naphthyl radicals, and aralkyl is to be understood as meaning, in particular, the benzyl radical. Particularly important substituents are, in addition, the acyl group and the acylamino group. The term acyl comprises, in particular, radicals of aromatic carboxylic or sulfonic acids, especially those of the benzene series or alkanoyl or alkylsulfonyl radicals which are low-molecular, i.e. contain 1 to 4 carbon atoms, for example the acetyl, benzoyl, p-chlorobenzoyl, p-phenylbenzoyl, benzenesulfonyl or p-toluenesulfonyl radical, and also low-molecular alkoxycarbonyl radicals and sulfonamide or carboxamide groups in which the nitrogen atom can be substituted by alkyl or aryl radicals, for example the ethoxycarbonyl, carbamoyl or sulfamoyl radical.

The acyl radical X is the radical of an aromatic carboxylic acid, in particular of the benzene series, which can be further substituted by chlorine, nitro, methyl, methoxy or other radicals, or an alkanoyl radical which can be further substituted in the alkyl moiety by chlorine, nitro, phenyl or other radicals. Examples of acyl radicals X are: benzoyl, p-chlorobenzoyl, p-nitrobenzoyl, p-phenylbenzoyl and acetyl.

The substituent Y' as a halogen atom is fluorine, chlorine or bromine, as an amino group is —NH₂ or in particular a substituted amino group, such as alkylamino or N,N-dialkylamino, in which the alkyl radicals can be further substituted, for example by halogen, hydroxyl or carboxyl, N-alkyl-N-phenylamino or phenylamino, in which the phenyl radical can be substituted by chlorine, methyl, methoxy, carboxyl, nitro or other radicals, 1-naphthylamino, cyclohexylamino or the radical of a N-heterocyclic compound, such as piperidino and morpholino, and as an aryloxy group is, for example, phenoxy or naphthoxy.

The compounds of the formula (2) which are to be used as starting materials are prepared by subjecting a compound of the formula $$A—NH_2 \quad (3)$$

in which A is as defined under formula (1), to a condensation reaction with a 2,4,6-trihalogeno-s-triazine of the formula

in a molar ratio of 1:1 and subjecting the resulting primary condensation product to a condensation reaction with a diaminoanthraquinone or a mixture of diaminoanthraquinones of the formula

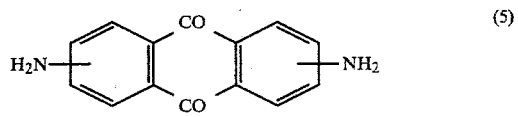

in a molar ratio of 1:1.

The compounds of the formula (2), which are used as starting materials for the process according to the invention, can, for example, be obtained as described above from the following components:

COMPOUNDS OF THE FORMULA (3)

1-aminoanthraquinone, 1-amino-4-methoxyanthraquinone, 1-amino-4-acetylaminoanthraquinone, 1-amino-4-benzoylaminoanthraquinone, 1-amino-4-(p-toluenesulfonylamino)-anthraquinone, 1-amino-4-(p-chlorobenzoylamino)-anthraquinone, 1-amino-4-[p-(N,N-dimethylsulfamido)-benzoylamino]-anthraquinone, 1-amino-4-phenylthio-anthraquinone, 1-amino-4-(4'-phenyl-benzoylamino)-anthraquinone or 1-amino-4-chloroanthraquinone and also the corresponding 1-aminoanthraquinones which are substituted in the 5-position or 8-position instead of in the 4-position, or 2-amino-anthraquinone, 1-amino-2-methyl-anthraquinone, 1-amino-3-chloro-anthraquinone, 1-amino-6,7-dichloro-anthraquinone, 1-amino-6-phenylthio-anthraquinone, 1-amino-7-phenylthio-anthraquinone, 1-amino-7-chloro-phenylthio-anthraquinone, 1-amino-7-chloro-6-phenylthio-anthraquinone, 1,4-diamino-2-acetyl-anthraquinone, 2-amino-3-chloro-anthraquinone, 2-amino-4-chloro-anthraquinone, 1-amino-2-chloro-anthraquinone, 1-amino-6-chloro-anthraquinone, 1-amino-3-chloro-6-methyl-anthraquinone, 1-amino-2-methyl-3-chloro-anthraquinone, 1-amino-7-chloro-anthraquinone, 2-amino-3,4-phthaloylacridone, 2-amino-6- or 7-chloro-3,4-phthaloylacridone, 2-amino-6-trifluoromethyl-3,4-phthaloylacridone, 2-amino-5,7-dichloro-3,4-phthaloylacridone, 2-amino-1,7-dichloro-3,4-phthaloylacridone, 8-amino-5-chloro-3,4-phthaloylacridone, 7-amino-1,2-benzo-5,6-phthaloylacridone, aminoanthanthrone, 5-aminoisothiazoloanthrone, 4-amino-1,1'-dianthrimido-2,2'-carbazole, 4,4'-diamino-1,1'-dianthrimido-2,2'-carbazole, bz-1-aminobenzanthrone, bz-1-amino-2-methyl-benzanthrone or 1-phenyl-5-aminoanthrapyrimidine.

2,4,6-Trihalogeno-s-triazines of the formula (4)

2,4,6-Trifluoro-s-triazine (cyanuric fluoride), 2,4,6-trichloro-s-triazine (cyanuric chloride) or 2,4,6-tribromo-s-triazine (cyanuric bromide).

Diaminoanthraquinones of the formula (5)

1,5-Diaminoanthraquinone, 1,8-diaminoanthraquinone, 1,7-diaminoanthraquinone, 1,6-diaminoanthraquinone, 2,6-diaminoanthraquinone or 2,7-diaminoanthraquinone.

The condensation reactions of the compounds of the formula (3), the 2,4,6-trihalogeno-s-triazines of the formula (4) and the diaminoanthraquinones of the formula (5) are carried out in an inert organic solvent or in mixtures of inert organic solvents and preferably at elevated temperature, for example at between 100° and 150° C. depending on the solvent. Advantageously, a condensation catalyst, for example diethylaniline, is added to the reaction mixture and a blanketing gas, for example nitrogen, is passed in during the reaction.

The compound of the formula (2) which is thus obtained is then reacted by the process according to the invention with an acylating agent and, if desired, with an amine or an aromatic hydroxy compound. The reaction of the compound of the formula (2) with the acylating agent, which contains the acyl radical X, and with an amine or an aromatic hydroxy compound is likewise carried out at elevated temperature and preferably in the same solvent as the condensation reactions between the compound of the formula (3), the 2,4,6-trihalogeno-s-triazine of the formula (4) and the diaminoanthraquinone of the formula (5). The reaction temperature essentially depends on the boiling point of the solvent. Preferred inert organic solvents are nitrobenzene, o-dichlorobenzene and trichlorobenzene. If desired, the acylating agent is added to the reaction mixture together with a condensation catalyst, for example pyridine. For the reasons given above, it is possible and advantageous to carry out the reactions according to the invention immediately following the preparation of the starting compounds of the formula (2), without intermediate isolation of the latter.

Suitable acylating agents, which contain the acyl radical X, which is as defined under formula (1), are, in particular, halides and anhydrides of aromatic and aliphatic carboxylic acids.

In a preferred embodiment of the process according to the invention the starting materials used are compounds of the formula (2) in which Y is chlorine and A is a 1- or 2-anthraquinonyl radical, which can be substituted by chlorine, bromine, methoxy, acetyl, amino, benzoylamino, phenylamino or phenylthio, or a 3,4-phthaloyl-2-acridonyl radical, which can be substituted by chlorine or trifluoromethyl.

In a further preferred embodiment of the process according to the invention, the acylating agent used is benzoyl chloride, which can be substituted by chlorine, bromine, methyl, methoxy, nitro or carboxyl, naphthoyl chloride, 1-aminoanthraquinone-2-carboxylic acid chloride, acetyl chloride, chloroacetyl chloride, bromoacetyl chloride, propionyl chloride, butyryl chloride or nicotinoyl chloride, and the amine or aromatic hydroxy compound used is a $C_1$–$C_4$-alkylamine or N,N-di-$C_{1-4}$-alkylamine, ethanolamine, N,N-di-ethanolamine, aniline, N-methylaniline, piperidine, morpholine or phenol.

Starting materials which can be used, in addition to the compounds of the formula (2), for the preparation of the vat dyes of the formula (1) by the process according to the invention are:

Acylating agents, which contain the acyl radical X acetyl chloride, acetic anhydride, propionyl chloride, propionic acid anhydride, butyryl chloride, acetyl bromide, acryloyl chloride, acrylic acid anhydride, crotonic acid anhydride, chloroacetyl chloride, chloroacetic acid anhydride, β-chloropropionyl chloride, γ-chlorobutyryl chloride, benzoyl chloride, benzoic acid anhydride, o-, m- and p-chlorobenzoyl chloride, benzoyl bromide, benzoyl fluoride, m- and p-nitrobenzoyl chloride, p-hydroxybenzoyl chloride, p-phenylbenzoyl chloride, chlorophenoxyacetyl chloride, phenylacetyl chloride, o-, m- and p-toluic acid chloride, naphthalene-1-carboxylic acid chloride, naphthalene-2-carboxylic acid chloride, napthalene-1-carboxylic acid anhydride, naphthalene-2-carboxylic acid anhydride, 2,3-hydroxynaphthoic acid chloride, 2-hydroxyanthracene-3-carboxylic acid chloride, anthraquinone-1-carboxylic acid chloride, anthraquinone-2-carboxylic acid chloride, anthraquinone-1-carboxylic acid anhydride, anthraquinone-2-carboxylic acid anhydride, 1-aminoanthraquinone-2-carboxylic acid chloride, nicotinoyl chloride, isophthaloyl chloride, terephthaloyl chloride and 4-methylsulfonylbenzenecarboxylic acid chloride.

Amines and aromatic hydroxy compounds ammonia, methylamine, dimethylamine, ethylamine, diethylamine, propylamine, isopropylamine, butylamine, dibutylamine, isobutylamine, sec.-butylamine, tert.-butylamine, hexylamine, methoxyethylamine, ethoxyethylamine, methoxypropylamine, chloroethylamine, hydroxyethylamine, dihydroxyethylamine, hydroxypropylamine, benzylamine, cyclohexylamine, aniline, o-, m- and p-toluidine, 2,3-, 2,4-, 2,5-, 2,6-, 3,4- and 3,5-dimethylaniline, o-, m- and p-chloroaniline, N-methylaniline, N-ethylaniline, 3- or 4-acetylaminoaniline, o-, m- and p-nitroaniline, o-, m- and p-aminophenol, 2-methyl-4-nitroaniline, 2-methyl-5-nitroaniline, 2,5-dimethoxyaniline, 3-methyl-4-nitroaniline, 2-nitro-4-methylaniline, 3-nitro-4-methylaniline, o-, m- and p-anisidine, o-, m- and p-phenetidine, 1-naphthylamine, 2-naphthylamine, 2-amino-1-hydroxynaphthalene, 1-amino-4-hydroxynaphthalene, 1-amino-8-hydroxynaphthalene, 1-amino-2-hydroxynaphthalene, 1-amino-7-hydroxynaphthalene, 2-, 3- and 4-aminopyridine, 2-aminobenzthiazole, 5-, 6- and 8-aminoquinoline, 2-aminopyrimidine, morpholine, piperidine, piperazine, phenol, o-, m- and p-chlorophenol, o-, m- and p-nitrophenol, 4-methylphenol, 4-methoxyphenol, α-naphthol, β-naphthol and 6-nitro-2-naphthol.

In place of a single diaminoanthraquinone of the formula (5), it is also possible to use a mixture of diaminoanthraquinones, for example a mixture of 1,5-, 1,6- and 1,7-diaminoanthraquinone, for the preparation of the compounds of the formula (2). Suitable mixtures of diaminoanthraquinones are, in particular, those formed during the industrial preparation of diaminoanthraquinones by dinitration of anthraquinone and subsequent reduction. In addition to the 1,8-, 1,5-, 1,7- and 1,6-diaminoanthraquinones, which are present in a predominant amount, such mixtures also contain, for example, small amounts of 2,7- and 2,8-diaminoanthraquinone (β-isomer) and 1-aminoanthraquinone; alternatively, such mixtures also contain, in addition to 1,6-, 1,8-, 1,7-, 2,6-, 2,7- and 1,5-diamino-anthraquinone, small amounts of 1-aminoanthraquinone, 2-aminoanthraquinone and 1-amino-2-, -4-, -5- and -8-hydroxyanthraquinone.

The vat dyes of the formula (1) prepared by the process according to the invention are suitable for dyeing and printing very diverse materials and in particular for dyeing and printing fibres made of natural or regenerated cellulose in the presence of reducing agents, for example dithionite.

The resulting dyeings are distinguished by good levelness. The fastness properties are in general very good, especially the fastness to light, fastness to water, fastness to chlorine and fastness to soda boiling. The novel dyes reserve polyester fibres well or stain them tone-in-tone, which makes them suitable for dyeing mixed fibres in a mixture with disperse dyes.

The dyes can also be used as pigments for very diverse pigment applications, for example in the finely divided form for dyeing rayon and viscose or cellulose ethers or cellulose esters, or high molecular weight polyamides or high molecular weight polyurethanes or polyesters in the spinning composition, and also for the preparation of coloured lacquers or lacquer precursors and solutions or products of acetylcellulose, nitrocellulose, natural resins or synthetic resins, such as polymerisation resins or condensation resins, for example aminoplasts, alkyd resins, phenoplasts, polyolefines, such as polystyrene, polyvinyl chloride, polyethylene, polypropylene, polyacrylonitrile, rubber, casein, silicone and silicone resins. In addition, they can advantageously be used in the preparation of coloured pencils, cosmetic preparations or laminated sheets.

According to the conventional process, asymmetrical vat dyes of the formula (1) are prepared by a condensation reaction of cyanuric chloride with a vattable amine and a diaminoanthraquinone which has already been monoacylated. In comparison, the process of the present application has a technical advantage, which lies in the fact that the total yield obtained is considerably higher than that obtained by the conventional process, since with the latter a large amount of by-product is formed during the prior monoacylation of a diaminoanthraquinone.

In the following examples, parts are by weight unless indicated otherwise, percentages are by weight and the temperatures are in degrees centigrade. The relationship between parts by weight and parts by volume is the same as that between grams and milliliters.

EXAMPLE 1

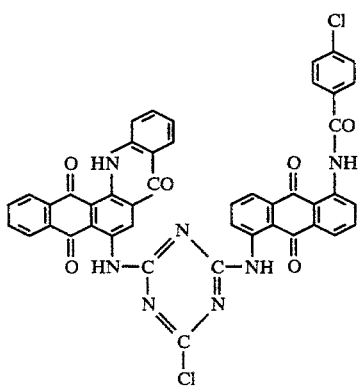

55.5 Parts of cyanuric chloride are dissolved in 1,600 parts of distilled nitrobenzene at room temperature. 102 Parts of 2-amino-3,4-phthaloylacridone and 80 parts of diethylaniline are then added. The suspension is stirred for 5 hours at 100° to 105° C., whilst passing in nitrogen. 71.5 Parts of 1,5-diaminoanthraquinone are then added.

The reaction mixture is heated to 140° to 145° C. and stirred for a further 8 hours. 60 Parts of 4-chlorobenzoyl chloride and 3 parts of pyridine are then added carefully and the reaction mixture is stirred at the same temperature for a further 4 hours. The reaction mixture is allowed to cool to room temperature and is filtered.

The material on the suction filter is washed with 300 parts of nitrobenzene and is then washed with ethanol until the filtrate contains no further nitrobenzene.

The material on the suction filter is dried overnight at 100° C. in a vacuum drying cabinet. Yield: 240 parts of olive dye.

EXAMPLE 2

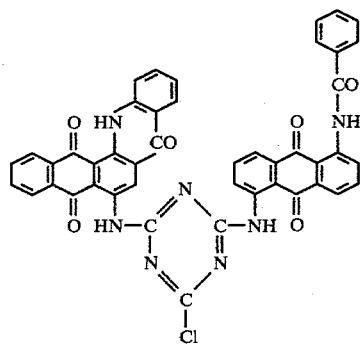

55.5 Parts of cyanuric chloride are dissolved in 1,600 parts of distilled nitrobenzene at room temperature. 102 Parts of 2-amino-3,4-phthaloylacridone and 80 parts of diethylaniline are then added. The suspension is stirred for 5 hours at 100° to 105° C., whilst passing in nitrogen. 71.5 Parts of 1,5-diaminoanthraquinone are then added.

The reaction mixture is heated to 140° to 145° C. and stirred for a further 8 hours. 60 Parts of benzoyl chloride and 3 parts of pyridine are then added carefully and the reaction mixture is stirred for a further 4 hours at the same temperature. The reaction mixture is allowed to cool to room temperature and is filtered.

The material on the suction filter is washed with 300 parts of nitrobenzene and is then washed with ethanol until the filtrate contains no further nitrobenzene.

The material on the suction filter is dried overnight at 100° C. in a vacuum drying cabinet. Yield: 227 parts of olive dye.

EXAMPLE 3

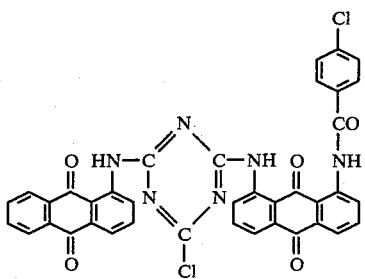

18.5 Parts of cyanuric chloride are dissolved in 500 parts of distilled nitrobenzene at room temperature. 22.3 Parts of 1-aminoanthraquinone and 25 parts of diethylaniline are then added. The suspension is stirred for 5 hours at 100° to 105° C., whilst passing in nitrogen. 23.8 Parts of 1,8-diaminoanthraquinone are then added.

The reaction mixture is heated to 140° to 145° C. and stirred for a further 8 hours.

18 Parts of 4-chlorobenzoyl chloride and 1 part of pyridine are then added carefully and the reaction mixture is stirred for a further 4 hours at the same temperature. The reaction mixture is allowed to cool to room temperature and is filtered.

The material on the suction filter is washed with 100 parts of nitrobenzene and is then washed with ethanol until the filtrate contains no further nitrobenzene.

The material on the suction filter is dried overnight at 100° C. in a vacuum drying cabinet. Yield: 66 parts of yellow dye.

EXAMPLE 4

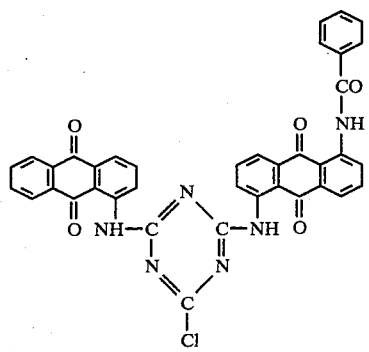

18.5 Parts of cyanuric chloride are dissolved in 500 parts of distilled nitrobenzene at room temperature. 22.3 Parts of 1-aminoanthraquinone and 25 parts of diethylaniline are then added. The suspension is stirred for 5 hours at 100° to 105° C., whilst passing in nitrogen. 23.8 Parts of 1,5-diaminoanthraquinone are then added.

The reaction mixture is heated to 140° to 145° C. and stirred for a further 8 hours.

17 Parts of benzoyl chloride and 1 part of pyridine are then added carefully and the reaction mixture is stirred for a further 4 hours at the same temperature. The reaction mixture is allowed to cool to room temperature and is filtered.

The material on the suction filter is washed with 100 parts of nitrobenzene and is then washed with ethanol until the filtrate contains no further nitrobenzene.

The material on the suction filter is dried overnight at 100° C. in a vacuum drying cabinet. Yield: 64 parts of yellow dye.

If the illustrative examples given above are repeated using, in place of 500 parts of nitrobenzene, the same amount of o-dichlorobenzene or trichlorobenzene, the same end product is obtained in equally high yield.

EXAMPLE 5

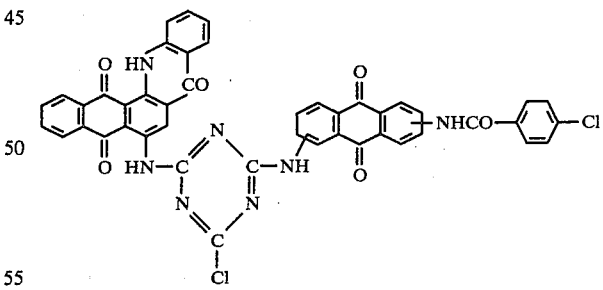

55.5 Parts of cyanuric chloride are dissolved in 1,600 parts of distilled nitrobenzene at room temperature. 102 Parts of 2-amino-3,4-phthaloylacridone and 80 parts of diethylaniline are then added. The suspension is stirred for 5 hours at 100° to 105° C., whilst passing in nitrogen. 71.5 Parts of a mixture of 37 parts of 1,6-diaminoanthraquinone, 23 parts of 1,8-diaminoanthraquinone, 16.6 parts of 1,7-diaminoanthraquinone, 6.4 parts of 1,5-diaminoanthraquinone, 2.4 parts of 2,6-diaminoanthraquinone, 2.6 parts of 2,7-diaminoanthraquinone, 1.4 parts of 1-aminoanthraquinone, 0.6 part of 2-aminoanthraquinone and 5.2 parts of amino-hydroxyanthraquinone are then added. The reaction mixture is heated to 140° to 145° C. and stirred for a further 8 hours.

60 Parts of 4-chlorobenzoyl chloride and 3 parts of pyridine are then added carefully and the reaction mixture is stirred for a further 4 hours at the same temperature. The reaction mixture is allowed to cool to room temperature and is filtered.

The material on the suction filter is washed with 300 parts of nitrobenzene and is then washed with ethanol until the filtrate contains no further nitrobenzene.

The material on the suction filter is dried overnight at 100° C. in a vacuum drying cabinet. Yield: 218 parts of olive dye.

EXAMPLE 6

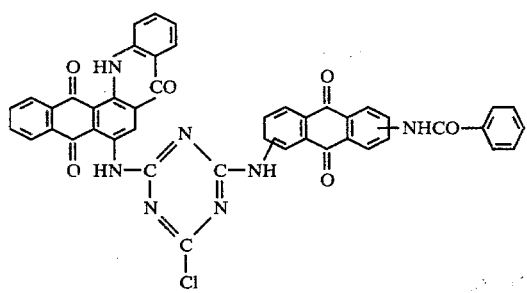

55.5 Parts of cyanuric chloride are dissolved in 1,600 parts of distilled nitrobenzene at room temperature. 102 Parts of 2-amino-3,4-phthaloylacridone and 80 parts of diethylaniline are then added. The suspension is stirred for 5 hours at 100° to 105° C., whilst passing in nitrogen. 71.5 Parts of a mixture of 62 parts of 1,8-diaminoanthraquinone, 1.42 parts of 1,5-diaminoanthraquinone, 14 parts of 1,7-diaminoanthraquinone, 3.28 parts of 1,6-diaminoanthraquinone, 0.76 part of the β-isomer and 0.56 part of 1-aminoanthraquinone are then added. The reaction mixture is heated to 140° to 145° C. and stirred for a further 8 hours.

60 Parts of benzoyl chloride and 3 parts of pyridine are then added carefully and the reaction mixture is stirred for a further 4 hours at the same temperature. The reaction mixture is allowed to cool to room temperature and is filtered.

The material on the suction filter is washed with 300 parts of nitrobenzene and is then washed with ethanol until the filtrate contains no further nitrobenzene.

The material on the suction filter is dried overnight at 100° C. in a vacuum drying cabinet. Yield: 215 parts of olive dye.

EXAMPLE 7

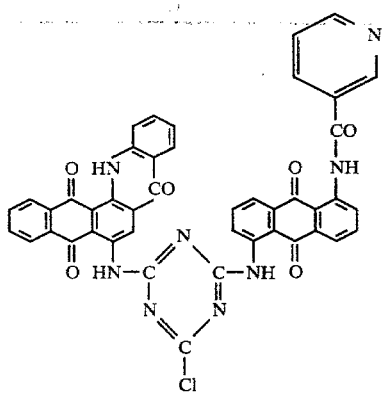

55.5 Parts of cyanuric chloride are dissolved in 1,600 parts of distilled nitrobenzene at room temperature. 102 Parts of 2-amino-3,4-phthaloylacridone and 80 parts of diethylaniline are then added. The suspension is stirred for 5 hours at 100° to 105° C., whilst passing in nitrogen. 71.5 Parts of 1,5-diaminoanthraquinone are then added. The reaction mixture is heated to 140° to 145° C. and stirred for a further 8 hours.

60 Parts of nicotinoyl chloride and 3 parts of pyridine are then added carefully and the reaction mixture is stirred for a further 4 hours at the same temperature. The reaction mixture is allowed to cool to room temperature and is filtered.

The material on the suction filter is washed with 300 parts of nitrobenzene and is then washed with ethanol until the filtrate contains no further nitrobenzene.

The material on the suction filter is dried overnight at 100° C. in a vacuum drying cabinet. Yield: 220 parts of olive dye.

The vat dyes of the formula

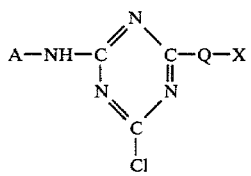

listed in Table I below are prepared by the same procedure as described in Examples 1 to 7. The groups A, Q and X in Table I have the same meaning as in the formula given above.

TABLE 1

| No. | A | Q | X | Shade on Cotton |
|---|---|---|---|---|
| 8 | (anthraquinonyl) | (anthraquinonyl-NH-) | Cl—⟨⟩—CO— | Yellow |
| 9 | " | " | (pyridyl)CO— | " |

TABLE 1-continued

| No. | A | Q | X | Shade on Cotton |
|---|---|---|---|---|
| 10 | " | " | (2-naphthyl)–CO– | " |
| 11 | " | " | (1-naphthyl)–CO– | " |
| 12 | " | " | 1-amino-anthraquinone-2-CO– | Orange |
| 13 | " | " | 4-(HOOC)–C₆H₄–CO– | Yellow |
| 14 | " | " | 3-(HOOC)–C₆H₄–CO– | " |
| 15 | 1-benzamido-5-methyl-anthraquinone | " | 4-Cl–C₆H₄–CO– | " |
| 16 | " | " | (3-pyridyl)–CO– | " |
| 17 | " | " | 1-amino-anthraquinone-2-CO– | Orange |
| 18 | 1-benzoyloxyamino-5-methyl-anthraquinone | " | " | Red |
| 19 | " | " | C₆H₅–CO– | Orange (reddish-tinged) |
| 20 | " | " | 4-Cl–C₆H₄–CO– | Orange (reddish-tinged) |
| 21 | " | " | (3-pyridyl)–CO– | Orange (reddish-tinged) |

TABLE 1-continued
| No. | A | Q | X | Shade on Cotton |
|-----|---|---|---|---|
| 22 | " | 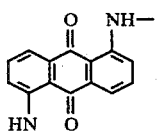 | 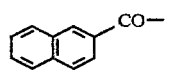 | Orange (reddish-tinged) |
| 23 | " | " |  | Orange (reddish-tinged) |
| 24 | 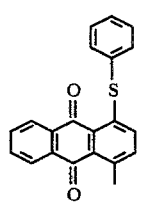 | " | 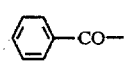 | Orange (reddish-tinged) |
| 25 | " | " | 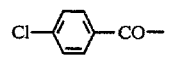 | Orange (reddish-tinged) |
| 26 | 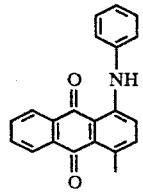 | 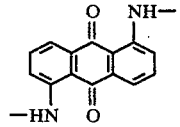 | 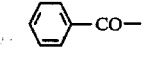 | olive |
| 27 | " | " | 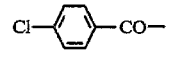 | " |
| 28 | 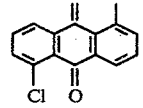 | " | 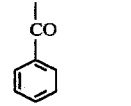 | Yellow |
| 29 | " | " | 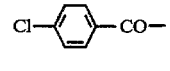 | " |
| 30 | 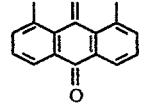 | " | 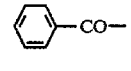 | " |
| 31 | " | " | 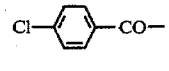 | " |
| 32 | 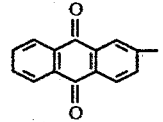 | " | 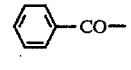 | " |
| 33 | " | " | 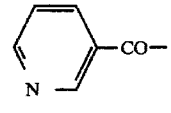 | " |

TABLE 1-continued

| No. | A | Q | X | Shade on Cotton |
|-----|---|---|---|-----------------|
| 34 | " | " | Cl—⟨C₆H₄⟩—CO— | " |
| 35 | 1-(2-carboxyphenylamino)-4-methylanthraquinone | " | HOOC—⟨C₆H₄⟩—CO— | Olive |
| 36 | " | " | 1-naphthyl-CO— | " |
| 37 | " | " | 2-naphthyl-CO— | " |
| 38 | 1-methylanthraquinone | 1,8-diaminoanthraquinone (—HN / NH—) | C₆H₅—CO— | Yellow |
| 39 | " | " | pyridine-CO— | " |
| 40 | " | " | 2-naphthyl-CO— | " |
| 41 | " | " | 1-naphthyl-CO— | " |
| 42 | " | " | 1-amino-anthraquinone-2-CO— | Orange |
| 43 | " | " | HOOC—⟨C₆H₄⟩—CO— (4-carboxy) | Yellow |
| 44 | 1-bromo-8-methylanthraquinone | " | HOOC—⟨C₆H₄⟩—CO— (3-carboxy) | " |
| 45 | 1-benzamido-5-methylanthraquinone | " | Cl—⟨C₆H₄⟩—CO— | " |

TABLE 1-continued
| No. | A | Q | X | Shade on Cotton |
|---|---|---|---|---|
| 46 | " | " | 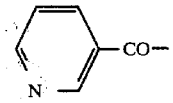 | " |
| 47 | " | " | 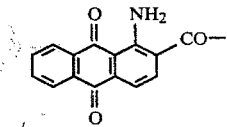 | Orange |
| 48 | 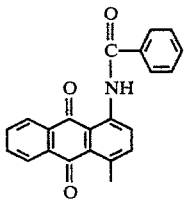 | " | 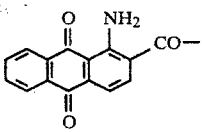 | Red |
| 49 | " | " | 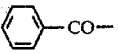 | Orange (reddish-tinged) |
| 50 | " | " | 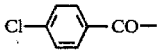 | Orange (reddish-tinged) |
| 51 | " | " | 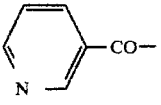 | Orange (reddish-tinged) |
| 52 | " | " | 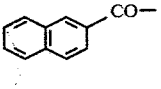 | Orange (reddish-tinged) |
| 53 | " | " |  | Orange (reddish-tinged) |
| 54 | 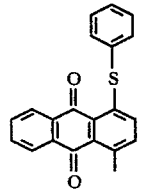 | " | 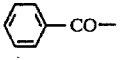 | Orange (reddish-tinged) |
| 55 | " | " | 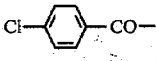 | Orange (reddish-tinged) |
| 56 | 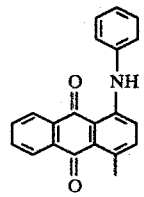 | " | 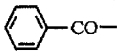 | Olive |
| 57 | " | " |  | " |

TABLE 1-continued

| No. | A | Q | X | Shade on Cotton |
|---|---|---|---|---|
| 58 | 1-methyl-8-bromo-anthraquinone | " | benzoyl (C₆H₅-CO-) | Yellow |
| 59 | " | " | 4-chlorobenzoyl | " |
| 60 | 1-methyl-8-chloro-anthraquinone | " | benzoyl | " |
| 61 | " | " | 4-chlorobenzoyl | " |
| 62 | 1-methyl-anthraquinone | " | benzoyl | " |
| 63 | " | " | nicotinoyl (pyridine-3-CO-) | " |
| 64 | " | " | 4-chlorobenzoyl | " |
| 65 | 1-(2-benzamido)-2,4-dimethyl-anthraquinone derivative | " | nicotinoyl | Olive |
| 66 | " | " | 1-naphthoyl | " |
| 67 | " | " | 2-naphthoyl | " |
| 68 | 1-methyl-anthraquinone | —HN—[anthraquinone-1,5-diyl]—HN— (1) | 4-chlorobenzoyl | Yellow |
| 69 | " | " | nicotinoyl | " |
| 70 | " | " | 2-naphthoyl | " |

TABLE 1-continued

| No. | A | Q | X | Shade on Cotton |
|---|---|---|---|---|
| 71 | " | " | —CO—(naphthyl) | " |
| 72 | " | —HN—(anthraquinone-2,6-diyl)—NH— (1) | 1-amino-anthraquinone-2-CO— | Orange |
| 73 | " | " | —CO—C6H4—COOH (para) | Yellow |
| 74 | " | " | —CO—C6H4—COOH (meta) | " |
| 75 | (1-benzamido-4-methyl-anthraquinone) | " | Cl—C6H4—CO— (para) | " |
| 76 | " | " | (pyridine-3-yl)—CO— | " |
| 77 | " | " | 1-amino-anthraquinone-2-CO— | Orange |
| 78 | (1-benzamido-4-methyl-anthraquinone) | " | " | Red |
| 79 | " | " | C6H5—CO— | Orange (reddish-tinged) |
| 80 | " | " | Cl—C6H4—CO— | Orange (reddish-tinged) |
| 81 | " | " | (pyridine-3-yl)—CO— | Orange (reddish-tinged) |

TABLE 1-continued
| No. | A | Q | X | Shade on Cotton |
|---|---|---|---|---|
| 82 | " | " | 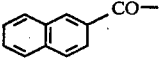 | Orange (reddish-tinged) |
| 83 | " | " |  | Orange (reddish-tinged) |
| 84 | 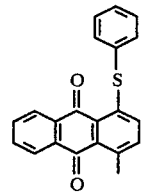 | " | 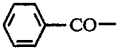 | Orange (reddish-tinged) |
| 85 | " | " | 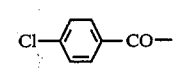 | Orange (reddish-tinged) |
| 86 | 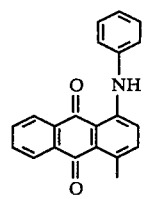 | " | 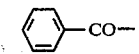 | Olive |
| 87 | " | " | 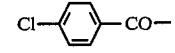 | " |
| 88 | 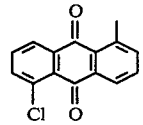 | " | 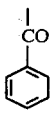 | Yellow |
| 89 | " | " | 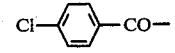 | " |
| 90 | 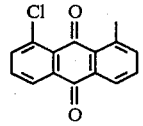 | " | 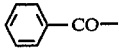 | " |
| 91 | " | " | 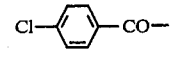 | " |
| 92 | 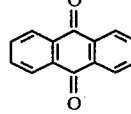 | " | 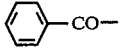 | " |
| 93 | " | " | 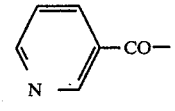 | " |
| 94 | " | " | 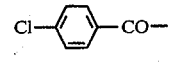 | " |

TABLE 1-continued

| No. | A | Q | X | Shade on Cotton |
|---|---|---|---|---|
| 95 | [anthraquinone-acridone structure] | " | [3-pyridyl-CO-] | Olive |
| 96 | " | " | [1-naphthyl-CO-] | " |
| 97 | " | " | [2-naphthyl-CO-] | " |
| 98 | [1-benzamido-4-methyl anthraquinone] | —HN—[anthraquinone]—NH— (2) | [1-amino-anthraquinone-2-CO-] | Red |
| 99 | " | " | [phenyl-CO-] | Orange (reddish-tinged) |
| 100 | " | " | [Cl—C₆H₄—CO-] | Orange (reddish-tinged) |
| 101 | " | " | [3-pyridyl-CO-] | Orange (reddish-tinged) |
| 102 | " | " | [2-naphthyl-CO-] | Orange (reddish-tinged) |
| 103 | " | " | [1-naphthyl-CO-] | Orange (reddish-tinged) |
| 104 | [1-phenylthio-4-methyl anthraquinone] | " | [phenyl-CO-] | Orange (reddish-tinged) |
| 105 | " | " | [Cl—C₆H₄—CO-] | Orange (reddish-tinged) |

TABLE 1-continued

| No. | A | Q | X | Shade on Cotton |
|---|---|---|---|---|
| 106 | 1-anilino-4-methyl-anthraquinone | " | C6H5—CO— | Olive |
| 107 | " | " | 4-Cl-C6H4—CO— | " |
| 108 | 1-methyl-anthraquinone | " | 4-Cl-C6H4—CO— | Yellow |
| 109 | " | " | pyridine-3-CO— | " |
| 110 | " | " | naphthalene-2-CO— | " |
| 111 | " | " | naphthalene-1-CO— | " |
| 112 | " | " | 1-amino-anthraquinone-2-CO— | Orange |
| 113 | " | " | 4-COOH-C6H4—CO— | Yellow |
| 114 | " | " | 3-COOH-C6H4—CO— | " |
| 115 | 1-benzamido-5-methyl-anthraquinone | " | 4-Cl-C6H4—CO— | " |
| 116 | " | " | pyridine-3-CO— | " |

TABLE 1-continued
| No. | A | Q | X | Shade on Cotton |
|---|---|---|---|---|
| 117 | " | " | 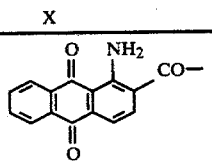 | Orange |
| 118 | 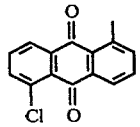 | " |  | Yellow |
| 119 | " | " |  | " |
| 120 | 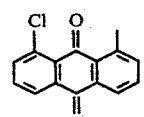 | " | 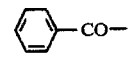 | " |
| 121 | " | " | 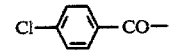 | " |
| 122 | 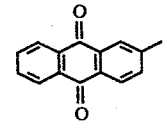 | " | 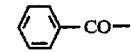 | " |
| 123 | " | " | 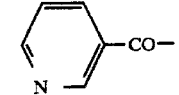 | " |
| 124 | " | " |  | " |
| 125 | 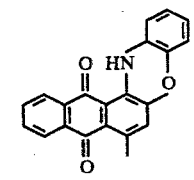 | " | 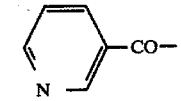 | Olive |
| 126 | " | " | 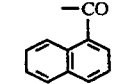 | " |
| 127 | " | " | 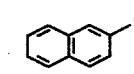 | " |
| 128 | " | " | 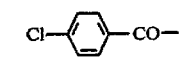 | " |
| 129 | 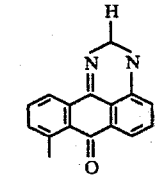 | 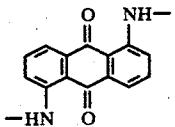 | 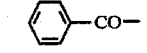 | Yellow |
| 130 | " | " | ClCH$_2$—CO— | " |

TABLE 1-continued
| No. | A | Q | X | Shade on Cotton |
|---|---|---|---|---|
| 131 | 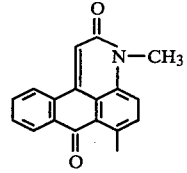 | " | 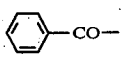—CO— | " |
| 132 | 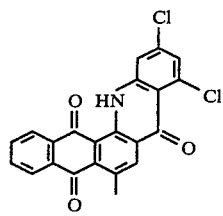 | " | " | Olive |
| 133 |  | " | $CH_3CH_2CH_2$—CO— | " |
| 134 | 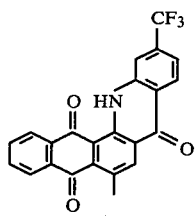 | " | 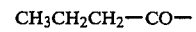 | " |
| 135 | " | " | 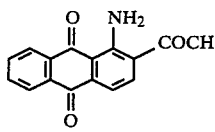 | " |
| 136 | 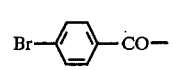 | " | 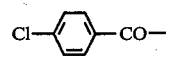—CO— | Yellow |
| 137 | " | " | " | " |
| 138 | 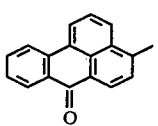 | 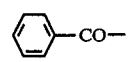 | $BrCH_2$—CO— | " |
| 139 | 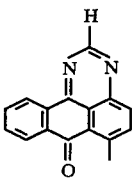 | " | $CH_3$—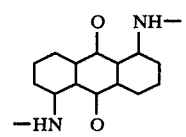—CO— | Orange |
| 140 | " | " | $CH_3$—CO— | " |
| 141 | 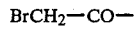 | " | $CH_3O$—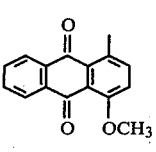—CO— | " |

TABLE 1-continued

| No. | A | Q | X | Shade on Cotton |
|-----|---|---|---|-----------------|
| 142 | " | " | O$_2$N—⟨⟩—CO— | " |
| 143 | " | " | CH$_3$CH$_2$—CO— | " |

(1) a mixture of 31.2 parts of 1,8-diaminoanthraquinone, 7.1 parts of 1,5-diaminoanthraquinone, 7.0 parts of 1,7-diaminoanthraquinone, 1.64 parts of 1,6-diaminoanthraquinone, 0.38 part of the β-isomer and 0.28 part of 1-aminoanthraquinone.
(2) a mixture of 18.5 parts of 1,6-diaminoanthraquinone, 11.5 parts of 1,8-diaminoanthraquinone, 8.3 parts of 1,7-diaminoanthraquinone, 3.2 parts of 1,5-diaminoanthraquinone, 1.2 parts of 2,6-diaminoanthraquinone, 1.3 parts of 2,7-diaminoanthraquinone, 0.7 part of 1-aminoanthraquinone, 0.3 part of 2-aminoanthraquinone and 2.6 parts of amino-hydroxy-anthraquinone.

EXAMPLE 144

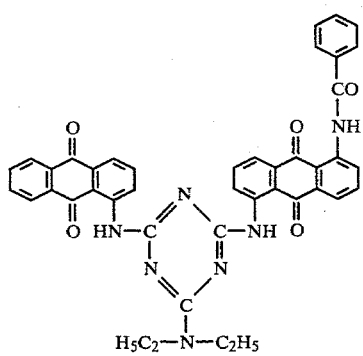

(a) 18.5 Parts of cyanuric chloride are dissolved in 500 parts of distilled nitrobenzene at room temperature. 22.3 Parts of 1-aminoanthraquinone and 25 parts of diethylaniline are then added. The suspension is stirred for 5 hours at 100° to 105° C., whilst passing in nitrogen. 23.8 Parts of 1,5-diaminoanthraquinone are then added. The reaction mixture is heated to 140° to 145° C. and stirred for a further 8 hours.

The mixture is then allowed to cool to room temperature and 25 parts of diethylamine are added, the resulting mixture is stirred for 5 hours at 120° to 125° C. and, after removing excess diethylamine, 20 parts of benzoyl choride and 1 part of pyridine are then added carefully and the reaction mixture is stirred for 4 hours at 140° to 145° C.

The reaction mixture is allowed to cool to room temperature and is filtered. The material on the suction filter is washed with 100 parts of nitrobenzene and is then washed with ethanol until the filtrate contains no further nitrobenzene. The material on the suction filter is dried overnight at 100° C. in a vacuum drying cabinet. Yield: 60 parts of golden-orange dye.

(b) 18.5 Parts of cyanuric chloride are dissolved in 500 parts of distilled nitrobenzene at room temperature. 22.3 Parts of 1-aminoanthraquinone and 25 parts of diethylaniline are then added. The suspension is stirred for 5 hours at 100° to 105° C., whilst passing in nitrogen. 23.8 Parts of 1,5-diaminoanthraquinone are then added. The reaction mixture is heated to 140° to 145° C. and stirred for a further 8 hours. 18 Parts of benzoyl chloride and 1 part of pyridine are then added carefully and the reaction mixture is stirred for a further 4 hours at the same temperature. It is then allowed to cool to room temperature and 30 parts of diethylamine are added, and the resulting mixture is stirred for 5 hours at 120° to 125° C.

The reaction mixture is allowed to cool to room temperature and is filtered. The material on the suction filter is washed with 100 parts of nitrobenzene and is then washed with ethanol until the filtrate contains no further nitrobenzene. The material on the suction filter is dried overnight at 100° C. in a vacuum drying cabinet. Yield: 59 parts of golden-orange dye.

EXAMPLE 145

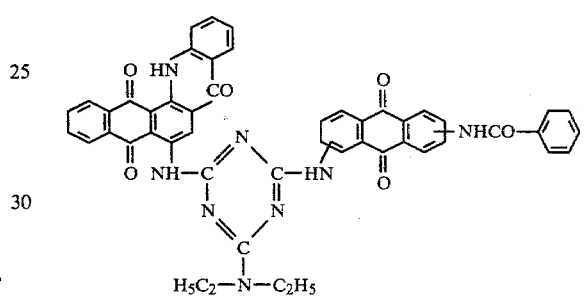

(a) 55.5 Parts of cyanuric chloride are dissolved in 1,600 parts of distilled nitrobenzene at room temperature. 102 Parts of 2-amino-3,4-phthaloylacridone and 80 parts of diethylaniline are then added. The suspension is stirred for 5 hours at 100° to 105° C., whilst passing in nitrogen. 71.5 Parts of a mixture of 62 parts of 1,8-diaminoanthraquinone, 1.42 parts of 1,5-diaminoanthraquinone, 14 parts of 1,7-diaminoanthraquinone, 3.28 parts of 1,6-diaminoanthraquinone, 0.76 part of the β-isomer and 0.56 part of 1-aminoanthraquinone are then added. The reaction mixture is heated to 140° to 145° C. and stirred for a further 8 hours. It is then allowed to cool to room temperature and 80 parts of diethylamine are added, and the resulting mixture is stirred for 5 hours at 120° to 125° C. and, after removing excess diethylamine, 65 parts of benzoyl chloride and 3 parts of pyridine are then added carefully and the resulting mixture is stirred for 4 hours at 140° to 145° C.

The reaction mixture is allowed to cool to room temperature and is filtered. The material on the suction filter is washed with 300 parts of nitrobenzene and is then washed with ethanol until the filtrate contains no further nitrobenzene. The material on the suction filter is dried overnight at 100° C. in a vacuum drying cabinet. Yield: 210 parts of olive dye.

(b) 55.5 Parts of cyanuric chloride are dissolved in 1,600 parts of distilled nitrobenzene at room temperature. 102 Parts of 2-amino-3,4-phthaloylacridone and 80 parts of diethylaniline are then added. The suspension is stirred for 5 hours at 100° to 105° C., whilst passing in nitrogen. 71.5 Parts of a mixture of 62 parts of 1,8-diaminoanthraquinone, 1.42 parts of 1,5-diaminoanthraquinone, 14 parts of 1,7-diaminoanthraquinone, 3.28 parts of 1,6-diaminoanthraquinone, 0.76 part of the β- isomer and 0.56 part of 1-aminoanthraquinone are then added. The reaction mixture is heated to 140° to 145° C. and stirred for a further 8 hours. 52 Parts of benzoyl chloride and 3 parts of pyridine are then added carefully and the mixture is stirred for a further 4 hours at the same temperature. It is then allowed to cool to room temperature and 90 parts of diethylamine are added, and the resulting mixture is stirred for 5 hours at 120° to 125° C.

The reaction mixture is allowed to cool to room temperature and is filtered. The material on the suction filter is washed with 300 parts of nitrobenzene and is then washed with ethanol until the filtrate contains no further nitrobenzene. The material on the suction filter is dried overnight at 100° C. in a vacuum drying cabinet. Yield: 210 parts of olive dye.

EXAMPLE 146

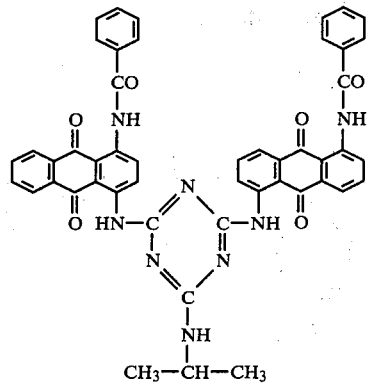

(a) 55.5 Parts of cyanuric chloride are dissolved in 1,600 parts of distilled nitrobenzene at room temperature. 102.6 Parts of 1-amino-4-benzoylamino-anthraquinone and 80 parts of diethylaniline are then added. The suspension is stirred for 5 hours at 100° to 105° C., whilst passing in nitrogen. 71.5 Parts of 1,5-diaminoanthraquinone are then added. The reaction mixture is heated to 140° to 145° C. and stirred for a further 8 hours. It is then allowed to cool to room temperature and 80 parts of isopropylamine are added, and the resulting mixture is stirred for 5 hours at 120° to 125° C. and, after removing excess isopropylamine, 65 parts of benzoyl chloride and 3 parts of pyridine are then added carefully and the resulting mixture is stirred for 4 hours at 140° to 145° C.

The reaction mixture is allowed to cool to room temperature and is filtered. The material on the suction filter is washed with 300 parts of nitrobenzene and is then washed with ethanol until the filtrate contains no further nitrobenzene. The material on the suction filter is dried overnight at 100° C. in a vacuum drying cabinet. Yield: 205 parts of brown-red dye.

(b) 55.5 Parts of cyanuric chloride are dissolved in 1,600 parts of distilled nitrobenzene at room temperature. 102.6 Parts of 1-amino-4-benzoylamino-anthraquinone and 80 parts of diethylaniline are then added. The suspension is stirred for 5 hours at 100° to 105° C., whilst passing in nitrogen. 71.5 Parts of 1,5-diaminoanthraquinone are then added. The reaction mixture is heated to 140° to 145° C. and stirred for a further 8 hours. 52 Parts of benzoyl chloride and 3 parts of pyridine are then added carefully and the resulting mixture is stirred for a further 4 hours at the same temperature.

It is then allowed to cool to room temperature and 90 parts of isopropylamine are added and the resulting mixture is stirred for 5 hours at 120° to 125° C. The reaction mixture is allowed to cool to room temperature and is filtered.

The material on the suction filter is washed with 300 parts of nitrobenzene and is then washed with ethanol until the filtrate contains no further nitrobenzene. The material on the suction filter is dried overnight at 100° C. in a vacuum drying cabinet. Yield: 204 parts of brown-red dye.

EXAMPLE 147

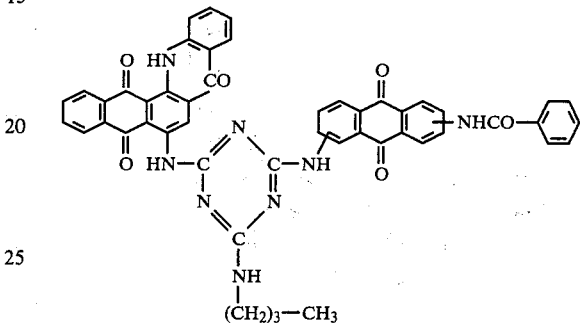

(a) 55.5 Parts of cyanuric chloride are dissolved in 1,600 parts of distilled nitrobenzene at room temperature. 102 Parts of 2-amino-3,4-phthaloylacridone and 80 parts of diethylaniline are then added. The suspension is stirred for 5 hours at 100° to 105° C., whilst passing in nitrogen. 71.5 Parts of a mixture of 18.5 parts of 1,6-diaminoanthraquinone, 11.5 parts of 1,8-diaminoanthraquinone, 8.3 parts of 1,7-diaminoanthraquinone, 3.2 parts of 1,5-diaminoanthraquinone, 1.2 parts of 2,6-diaminoanthraquinone, 1.3 parts of 2,7-diaminoanthraquinone, 0.7 part of 1-aminoanthraquinone, 0.3 parts of 2-aminoanthraquinone and 2.6 parts of aminohydroxy-anthraquinone are then added. The reaction mixture is heated to 140° to 145° C. and stirred for a further 8 hours. It is then allowed to cool to room temperature and 80 parts of n-butylamine are added and the resulting mixture is stirred for 5 hours at 120° to 125° C. and, after removing excess n-butylamine, 65 parts of benzoyl chloride and 3 parts of pyridine are then added carefully and the resulting mixture is stirred for 4 hours at 140° to 145° C. The reaction mixture is allowed to cool to room temperature and is filtered.

The material on the suction filter is washed with 300 parts of nitrobenzene and is then washed with ethanol until the filtrate contains no further nitrobenzene. The material on the suction filter is dried overnight at 100° C. in a vacuum drying cabinet. Yield: 208 parts of olive dye.

(b) 55.5 Parts of cyanuric chloride are dissolved in 1,600 parts of distilled nitrobenzene at room temperature. 102 Parts of 2-amino-3,4-phthaloylacridone and 80 parts of diethylaniline are then added. The suspension is stirred for 5 hours at 100° to 105° C., whilst passing in nitrogen. 71.5 Parts of a mixture of 18.5 parts of 1,6-diaminoanthraquinone, 11.5 parts of 1,8-diaminoanthraquinone, 8.3 parts of 1,7-diaminoanthraquinone, 3.2 parts of 1,5-diaminoanthraquinone, 1.2 parts of 2,6-diaminoanthraquinone, 1.3 parts of 2,7-diaminoanthraquinone, 0.7 part of 1-aminoanthraquinone, 0.3 part of 2-aminoanthraquinone and 2.6 parts of amino-hydroxy-anthraquinone are then added.

The reaction mixture is heated to 140° to 145° C. and stirred for a further 8 hours. 5 Parts of benzoyl chloride and 3 parts of pyridine are then added carefully and the resulting mixture is stirred for a further 4 hours at the same temperature. It is then allowed to cool to room temperature and 90 parts of n-butylamine are added and the mixture is stirred for 5 hours at 120° to 125° C. The reaction mixture is allowed to cool to room temperature and is filtered. The material on the suction filter is washed with 300 parts of nitrobenzene and is then washed with ethanol until the filtrate contains no further nitrobenzene. The material on the suction filter is dried overnight at 100° C. in a vacuum drying cabinet. Yield: 207 parts of olive dye.

If the illustrative examples given above are repeated using, in place of 1,600 parts of nitrobenzene, the same amount of o-dichlorobenzene or trichlorobenzene, the same end product is obtained in equally high yield.

EXAMPLE 148

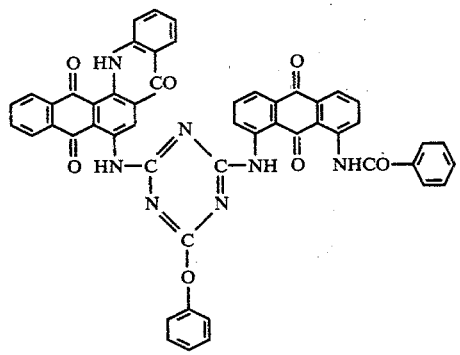

55.5 Parts of cyanuric chloride are dissolved in 1,600 parts of distilled nitrobenzene at room temperature. 102 Parts of 2-amino-3,4-phthaloylacridone and 80 parts of diethylaniline are then added. The suspension is stirred for 5 hours at 100° to 105° C., whilst passing in nitrogen. 71.5 Parts of 1,8-diaminoanthraquinone are then added. The reaction mixture is heated to 140° to 145° C. and stirred for a further 8 hours. 50 Parts of benzoyl chloride and 3 parts of pyridine are then added carefully and the resulting mixture is stirred for a further 4 hours at the same temperature. It is then allowed to cool to room temperature and 40 parts of phenol and 20 parts of sodium carbonate are added, and the resulting mixture is stirred for 5 hours at 135° to 140° C. The reaction mixture is allowed to cool to room temperature and is filtered.

The material on the suction filter is washed with 300 parts of nitrobenzene and is then washed with ethanol until the filtrate contains no further nitrobenzene. It is then washed with water until neutral. The material on the suction filter is dried overnight at 100° C. in a vacuum drying cabinet. Yield: 225 parts of olive dye.

The vat dyes of the formula

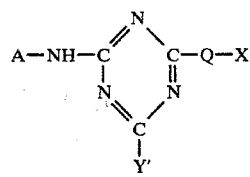

listed in Table II below are prepared by the same procedures as described in Examples 129 to 133. The groups A, Q, X and Y' in Table II have the same meaning as in the formula indicated above.

TABLE II

| No. | A | Q | X | Y' | Shade on cotton |
|---|---|---|---|---|---|
| 149 | ![anthraquinone] | ![aminoanthraquinone NH—] | ![phenyl]—CO— | —N(morpholine)O | orange |
| 150 | " | " | ![naphthyl]—CO— | —NH—(CH$_2$)$_3$—CH$_3$ | " |
| 151 | " | " | " | —N(piperidine) | " |
| 152 | " | " | " | —N(morpholine)O | " |
| 153 | " | " | ![naphthyl]—CO | —NH—![phenyl] | " |
| 154 | " | " | " | —NH—(CH$_2$)$_2$—OH | " |
| 155 | " | " | " | —N((CH$_2$)$_2$—OH)$_2$ | " |

TABLE II-continued

| No. | A | Q | X | Y' | Shade on cotton |
|---|---|---|---|---|---|
| 156 | [benzamido-methyl-anthraquinone structure] | " | [pyridine-3-CO—] | —N(C2H5)2 | brown-red |
| 157 | " | " | " | —N(CH3)(C6H5) | " |
| 158 | [anthraquinone with HN-CO-phenyl fused structure] | " | [C6H5—CO—] | —N(C2H5)2 | olive |
| 159 | " | " | " | —N(morpholino) | olive |
| 160 | [methyl-anthraquinone] | —HN—[anthraquinone]—NH— (1) | Cl—C6H4—CO— | —NH—C6H5 | orange |
| 161 | [phenylamino-methyl-anthraquinone] | —HN—[anthraquinone]—NH— (2) | C6H5—CO— | —N(morpholino) | olive |
| 162 | [benzamido-methyl-anthraquinone] | —HN—[1,8-diamino-anthraquinone]—NH— | [pyridine-3-CO—] | —N(C2H5)2 | brown-red |
| 163 | [anthraquinone with HN-CO-phenyl fused structure] | —HN—[anthraquinone]—NH— (1) | [naphthyl-2-CO] | —N((CH2)2—OH)2 | olive |
| 164 | [chloro-methyl-anthraquinone] | —HN—[1,8-diamino-anthraquinone]—NH— | [1-amino-anthraquinone-2-CO—] | —NH—CH(CH3)2 | orange |
| 165 | [chloro-methyl-anthraquinone] | " | C6H5—CO— | —NH(CH2)2—OH | " |

DYEING METHOD I

1 Parts of the dye obtained according to Example 1 is vatted with 10 parts by volume of sodium hydroxide solution of 36° Bé and 5 parts of sodium hydrosulfite in 200 parts of water at 50° to 70° C. The above stock vat is added to a dyebath which contains 5 parts by volume of sodium hydroxide solution of 36° Bé and 3.7 parts of sodium hydrosulfite in 200 parts of water, and 100 parts of cotton are put into the bath at 40° C. 15 Parts of sodium chloride are added after 10 minutes and a further 15 parts are added after 20 minutes and dyeing is carried out at 40° C. for 45 minutes. The cotton is then squeezed off, oxidised and finished in the conventional manner.

DYEING METHOD II

1 Part of the dye obtained according to Example 1 and 0.5 part of C.I. Disperse Yellow 84 are ground wet with 2.5 parts of a 50% aqueous solution of the sodium salt of dinaphthylmethanedisulfonic acid. A liquor is prepared using this dye preparation, 2 parts of ammonium sulfate and 1,000 parts of water, and the pH value of the liquor is brought to 6.0 to 6.9 with the aid of monosodium phosphate.

100 Parts of a mixed fabric of cotton and polyester (67% polyester) are put into this bath and the bath is warmed to 120° to 125° C. in the course of 45 minutes. Dyeing is carried out in the closed vessel for 60 minutes at this temperature, the liquor is allowed to cool to 60° to 70° C. and 20 parts by volume of sodium hydroxide solution of 36° Bé and 5 parts of sodium hydrosulfite are added. After 45 minutes the fabric is squeezed off, oxidised and finished in the conventional manner. A yellow coloured mixed fabric is obtained.

PIGMENT DYEING

5 Parts of the dye obtained according to Example 1 are mixed with 95 parts of dioctyl phthalate and the mixture is ground in a ball mill until the dye particles are smaller than 3μ.

0.8 Part of this dioctyl phthalate paste is mixed with 13 parts of polyvinyl chloride, 7 parts of dioctyl phthalate and 0.1 part of cadmium stearate and the mixture is then rolled for 5 minutes on a two-roll mill at 140° C. A yellow coloured material is obtained which has good migration characteristics and good fastness to light.

COLOURING BY LACQUERING

Ten (10) g of titanium dioxide and 2 g of the dye obtained according to Example 1 are ground with a mixture of 26.4 g of coconut alkyd resin, 24.0 g of melamine-formaldehyde resin (50% solids content), 8.8 g of ethylene glycol monomethyl ether and 28.8 g of xylene for 48 hours in a ball mill.

If this lacquer is sprayed onto an aluminium foil, pre-dried for 30 minutes at room temperature and then stoved for 30 minutes at 120° C., a clear red lacquer coating is obtained which is distinguished by good fastness to weathering, coupled with good depth of colour.

What is claimed is:

1. In a process for the preparation of a vat dye of the formula

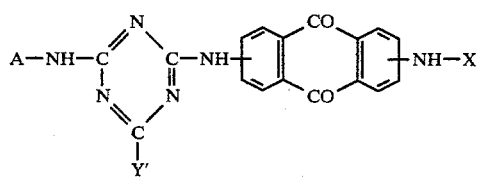

in which A is a vattable radical, X is an acyl radical of an aromatic carboxylic acid or an alkanoyl radical and Y' is an amino group or an aryloxy group which comprises reacting a compound of the formula

A—NH$_2$ with a 2,4,6-trihalogeno-s-triazine of the formula

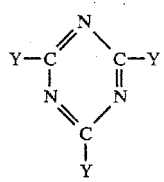

in which Y is a halogen atom, in a molar ratio of 1:1, subjecting the resulting primary condensation product to a condensation reaction with a diaminoanthraquinone or a mixture of diaminoanthraquinones of the formula

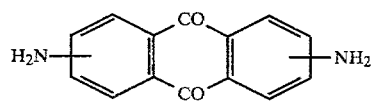

in a molar ratio of 1:1 to form a compound of the formula

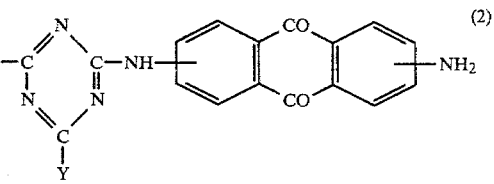

acylating the compound of formula (2) by reacting with an acylating agent which contains the radical X, and subjecting the resultant product to a condensation reaction with an amine or an aromatic hydroxy compound to form the vat dye of formula (1), the improvement wherein the reaction of the compound of formula (2) with the acylating agent is carried out immediately following the preparation of the compound of formula (2) without intermediate isolation of the compound of formula (2).

2. A process according to claim 1, wherein the compound of formula (2) is a compound in which Y is chlorine and A is a 1- or 2-anthraquinonyl radical which is unsubstituted or is substituted by chlorine, bromine, methoxy, acetyl, amino, benzoylamino, phenylamino or phenylthio, or a 3,4-phthaloyl-2-acridonyl radical, which radical is unsubstituted or is substituted by chlorine or trifluoromethyl.

3. A process according to claim 1 or 2, wherein the acylating agent used to react with a compound of formula (2) is benzoyl chloride which is unsubstituted or substituted by chlorine, bromine, methyl, methoxy, nitro or carboxyl, naphthoyl chloride, 1-aminoanthraquinone-2-carboxylic acid chloride, acetyl chloride, chloroacetyl chloride, bromoacetyl chloride, propionyl chloride, butyryl chloride or nicotinoyl chloride, and the amino or aromatic hydroxy compound used is a $C_1$-$C_4$-alkylamine or N,N-di-$C_{1-4}$-alkylamine, ethanolamine, N,N-diethanolamine, aniline, N-methylaniline, piperidine, morpholine or phenol.

4. A process according to claim 1 wherein the reaction of the compound of the formula (2) with an acylating agent which contains the acyl radical X and the reaction with an amino or an aromatic hydroxy compound are carried out at elevated temperature.

5. A process according to claim 4, wherein the reactions are carried out in an inert organic solvent or in a mixture of inert organic solvents.

6. A process according to claim 5, wherein the inert organic solvent used is nitrobenzene, o-dichlorobenzene or trichlorobenzene.

7. A process according to claim 1 wherein the acylating agent for reaction with a compound of formula (2) is added to the reaction mixture together with a condensation catalyst.

* * * * *